United States Patent

[11] 3,604,449

| [72] | Inventors | Shinpei Miyamoto; Kohji Sato, both of Nagasaki-shi, Japan |
|---|---|---|
| [21] | Appl. No. | 858,655 |
| [22] | Filed | Sept. 17, 1969 |
| [45] | Patented | Sept. 14, 1971 |
| [73] | Assignee | Mitsubishi Jukogyo Kabushiki Kaisha Tokyo, Japan |
| [32] | Priority | Sept. 25, 1968 |
| [33] | | Japan |
| [31] | | 43/69281 |

[54] APPARATUS FOR UNLOADING LIQUID STORAGE TANKS
6 Claims, 1 Drawing Fig.

[52] U.S. Cl. .................................................. 137/398, 137/569, 222/67
[51] Int. Cl. .................................................. F16k 31/18, B67d 5/52
[50] Field of Search ............................................ 137/344, 386, 398, 399, 561, 565, 569; 114/.5, 74; 417/77, 80; 222/67, 318

[56] References Cited
UNITED STATES PATENTS

| 2,239,590 | 4/1941 | Class .............................. | 137/399 |
| 2,769,455 | 11/1956 | Massey et al. .................. | 137/398 X |
| 3,253,746 | 5/1966 | Vreedenburgh ................ | 222/67 |

Primary Examiner—M. Cary Nelson
Assistant Examiner—David R. Matthews
Attorney—McGlew and Toren ABSTRACT: In unloading liquid from a plurality of storage tanks, such as in an oil tanker, a separation tank is positioned between an unloading pump and the storage tanks and a suction unit is used for supplying the liquid into the separation tank when the level in the storage tanks drops below a certain point. During ordinary unloading operations, the liquid is bypassed around the separation tank to the unloading pump. When in use, the liquid level in the separation tank is checked for regulating the flow from the unloading pump so that a flow of liquid is maintained through the unloading pump and supplied to the suction unit for maintaining the pumping operation regardless of the level to which the liquid drops in the tanks being unloaded.

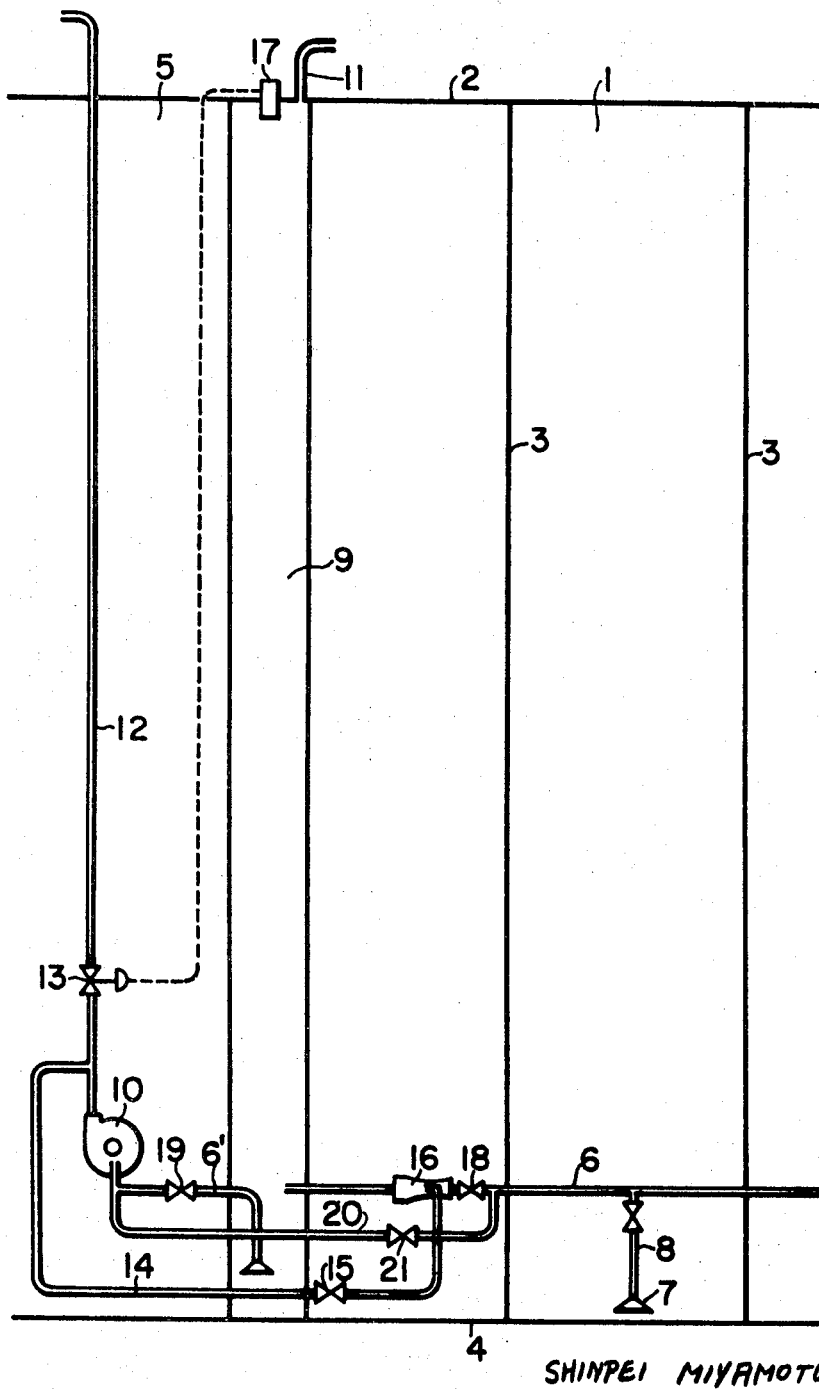

APPARATUS FOR UNLOADING LIQUID STORAGE TANKS

SUMMARY OF THE INVENTION

The present invention is directed to liquid-unloading apparatus and, more particularly, it is concerned with such apparatus used in unloading the storage tanks in an oil tanker where the same unloading pump is used for the entire operation and a separation tank is utilized as the level drops in the storage tanks to prevent the passage of air or gas into the unloading pump.

In unloading oil from tankers and similar liquid-unloading operations, as a general rule, the unloading work must be completed in as short a period of time as possible. To accomplish this purpose, centrifugal pumps of large capacity have been used in the past, however, when the level of the oil in the storage tanks drops below a certain point, the pump is unable to continue operation because of cavitation within the pump or because air or gas is drawn into the pump from the storage tank. For these reasons, reciprocating pumps and the like have been used in combination with the centrifugal pumps for completely unloading the oil from the storage tanks. However, the use of two separate pumping systems is uneconomical because of the duplication of equipment and piping systems and also because of the extended time period required to complete the unloading operation.

In an effort to solve the difficulties experienced in the past, recently a method has been proposed for positioning a small auxiliary tank between the centrifugal pump and the storage tanks so that air or gas sucked into the piping system from the storage tanks is separated in the auxiliary tank before it reaches the centrifugal pump. However, the use of such an auxiliary tank has the following disadvantages:

1. It requires a vacuum pump or similar equipment for discharging the gas from the auxiliary tank because the gas separation therein is achieved by reducing the pressure in the tank;
2. The oil in the storage tank cannot be completely unloaded because the gas entering though the suction port is restricted based on the capacity of the vacuum pump; and
3. The liquid level within the auxiliary tank must be regulated to prevent oil from entering into the vacuum pump used for extracting the gas.

Due to these factors, the proposed system has been found to be disadvantageous for reasons of performance and economy. To overcome one of the problems indicated above, it has been suggested to increase the size of the auxiliary tank so that the level of the liquid does not vary too rapidly, however, while increasing the size of the tank assists in overcoming one of the disadvantages, it does not aid in solving the other problems faced in the use of the auxiliary tank.

Therefore, the present invention has as its purpose to avoid the problems experienced in the past and its primary object is to obtain a complete and rapid unloading of liquid from storage tanks with an arrangement of apparatus which is simple in both arrangement and operation.

BRIEF STATEMENT OF THE INVENTION

Therefore, in accordance with the present invention, the liquid-unloading apparatus includes a separation tank for removing the air or gas from the liquid being unloaded before it reaches the unloading pump, when the level of the liquid approaches the bottom of the storage tanks. During normal unloading operations the separation tank is not required, however, when it is used, a fluid suction unit, such as an eductor or pump, is located in the pumping system for removing the liquid from the storage tanks and delivering it into the separation tank. When in operation, the fluid suction unit is driven by part of the liquid being discharged from the unloading pump which is diverted to the fluid suction unit. To regulate the flow diverted to the fluid suction unit, a control valve is positioned in the line supplying the driving liquid and a control valve is also positioned in the discharge line from the unloading pump for regulating flow to the suction unit. When the separation tank is in use, the liquid level is checked to maintain it at a constant depth by regulating the control valve in the discharge line from the unloading pump and also by regulating the valve in the line which supplies the driving liquid to the suction unit. A gas or air vent pipe is provided from the separation tank opening to the atmosphere or into one of the liquid storage tanks.

During normal unloading operations, a bypass line is provided in the piping system for circulating the liquid from the storage tanks directly into the unloading pump and diverting it about the suction unit and the separation tank.

Therefore, the present invention is intended to overcome the various disadvantages which have been experienced in the past, and to afford a method of and equipment for completely unloading liquid from storage tanks in a fast and efficient operation.

The various features of novelty which characterize the invention are pointed out with particularity in the claims annexed to d forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:
The drawing illustrates, in a schematic arrangement, the apparatus embodying the present invention for unloading the storage tanks in an oil tanker.

DETAILED DESCRIPTION OF THE PREFERRED EMBODIMENT

In the drawing, an oil tanker is shown schematically along the center line of the vessel and it is divided into a plurality of oil storage tanks 1 by means of partition walls 3 which extend between an upper deck 2 and the bottom 4 of the vessel. Extending into each of the storage tanks 1 is a main suction pipe 6 from which a branch pipe 8 extends downwardly having a bell-mouth opening 7 at its lower end located at the bottom of the storage tanks.

Located adjacent the storage tanks is a separation tank 9 which is connected to an unloading pump 10 by means of a suction pipe 6' having a bellmouthed opening at its inlet end. The main suction pipe 6 from the storage tanks is arranged to deliver liquid into the separation tank. At the upper end of the separation tank 9, a vent or exhaust pipe 11 is provided for discharging air or gas into the atmosphere. While the exhaust pipe 11 is shown in this embodiment opening into the atmosphere it will be appreciated that it could also be connected to one of the storage tanks.

Liquid is discharged from the unloading pump 10 through an outlet line 12 and a control valve 13 is located in the outlet line for regulating the discharge from the pump.

Schematically indicated at the upper end of the separation tank 9 is a liquid level controller 17 which detects the height of the liquid level in the tank. As shown by the dotted line the liquid level controller is in communication with the control valve 13 for regulating the extent to which the valve is opened for maintaining the height of the liquid in the tank at a predetermined level.

Connected to the outlet line 12 between the discharge opening from the pump 10 and the control valve 13, is a liquid feed line 14 which extends to a fluid suction unit 16 located in the main suction line 6 at a point upstream from its outlet into the separation tank 9. A control valve 15 is positioned in the feed line 14 for regulating flow to the fluid suction unit 16. Each of the main suction line 6 and the suction line 6' between the separation tank and the pump 10 is provided with a control valve 18, 19, respectively.

For diverting flow about the separation tank 9 and the fluid suction unit 16, a bypass line 20 is connected at one end to the inlet to the pump 10 and at its other end to the main suction line 6 at a position upstream from the control valve 18. A valve 21 is positioned in the bypass line 20 for controlling flow into the unloading pump.

Under normal unloading operating conditions i.e., until the liquid level in the storage tanks is lowered to a level near the bellmouthed opening 7, the valves 18 and 19 in the suction lines 6, 6', respectively, and the valve 15 in feed line 14 are closed and the valve 21 in the bypass line is open so that the oil is sucked directly from the suction tanks into the main suction line 6, then through the bypass line 20 into the unloading pump 10. In this arrangement the oil bypasses the fluid suction unit 16 and the separation tank 9. The valve 13 in the outlet line 12 is opened and the oil is pumped directly to another storage location or a point of use exteriorly of the tanker. As long as the level of the oil in the individual storage tanks is maintained above a certain point, the regular pumping operation will continue. However, as the pumping continues a point will be reached at which the normal pumping operation will become difficult as the level of the oil in the storage tank drops at which point the flow through the bypass line 20 is discontinued by closing the valve 21 and the valves 18 and 19 are opened to direct flow into the separation tank and from the separation tank into the pump 10, respectively, and the valve 15 in feed line 14 is opened to provide a supply of operating liquid from the outlet line 12 to the fluid suction unit 16. At the same time, the liquid level controller 17 n the separation tank becomes operative for maintaining the oil level at a predetermined height. By means of the fluid suction unit 16 the oil within the storage tank 1 is sucked into the separation tank 9 so that the tank can be completely unloaded.

It is to be understood that the level controller 17 and control valve 13 may be state of the art devices well known to designers of unloading systems of the type disclosed herein. For example, the level controller 17 may be a conventional type using a float or other means for determining when the liquid level in the separator tank 9 drops to a predetermined minimum level required to assure an adequate supply of liquid to the unloading pump 10, taking into account the design and operating capacities of the system, including the pump, outlet capacity and supply to the separator tank, and for mechanically or otherwise actuating an electrical switch or pneumatic controller which, in turn, operates the control valve 13 in a manner well known in the art. It will be apparent that closing of the valve 13 tends to maintain the level of the liquid in separator tank 9 by preventing its discharge through outlet 12. As the level in separator tank 9 rises above the predetermined minimum level, the level controller 17 will detect same and actuate the control valve 13 to the open position, thereby discharging liquid from the separator tank 9 trough outlet 12.

It will also be apparent that when the level controller 17 causes the control valve 13 to close, liquid passing through the pump 10 will be recirculated through the feed line 14 including the valve 15, to the suction unit 16, and back to the separator tank 9; thus, maintaining sufficient liquid therein to prevent the pump 10 from running out of liquid and losing suction.

While the suction unit 16 unloads the storage tank 1 the level of the oil in the storage tank drops to a point where air or gas is drawn into the bellmouthed opening 7 and passes with the oil into the separation tank 9. Within the separation tank the air or gas is separated from the oil and is vented to the atmosphere through the exhaust pipe 11. Accordingly, the oil from the separation tank is drawn into the pump 10 through the suction line 6' without any air or gas entering the pump which would hinder its operation especially when the final stripping of the oil from the storage tanks is being accomplished.

When a storage tank 1 is completely unloaded, only air is drawn into the main suction line through the bellmouthed opening 7, however, due to the action of the liquid level controller 17 the control valve 13 in the outlet line from the pump 10 is completely closed and the oil is circulated from the pump 10 through feed line 14 into the fluid suction unit 16 and then into the separation tank 9, with the result that the pumping operation need not be discontinued as the changeover is made from the empty storage tank to the next tank to be unloaded.

As mentioned above, the exhaust pipe 11 is shown venting to the atmosphere, however, it may be more advantageous if the pipe 11 is connected to the upper portion of a storage tank 1 to avoid any problems which might occur if oil enters the exhaust pipe due to a fluctuation in the level of the separation tank.

In the embodiment described the control valve 13 for the discharge line 12 from the pump 10 is regulated automatically by the liquid level controller to assure that the amount of oil supplied into the separation tank is sufficient to maintain its liquid level constant. However, the valve 13 need not be automatically controlled but may be manually operated by using a liquid level alarm device for indicating to an operator when the required adjustment is necessary.

Though, in the embodiment set forth in the drawing, only the valve 13 is controlled by the liquid level controller 17, it is also possible to use the same means for regulating the valve 15 in the feed line 14 for the fluid suction unit 16. The quantity of oil withdrawn from the storage tank into the separation tank 9 by the suction unit 16 varies in dependence on the quantity of oil supplied through the feed line 14. Accordingly, the control valve 15 in the feed line 14 can be controlled by the liquid level controller 17 to regulate the level of the oil in the separation tank 9. However, if flow through the valve 15 is regulated by the liquid level controller 17, it is desirable also to control the valve 13 either manually or automatically at the same time to assure that no problems arise in the development of cavitation in the fluid suction unit 16 or in lowering the efficiency of the unloading operation of reducing the time required for emptying the storage tank.

In the past, equipment has been proposed which appears, under superficial observation, to be analogous to the apparatus embodying the present invention. However, in the previously proposed equipment the driving fluid for the eductor used in the final steps of unloading the oil from the storage tanks, was reserved in a tank located at a predetermined height relative to the equipment for accomplishing the final unloading or stripping of the storage tank.

However, the apparatus embodying the present invention is fundamentally different from that proposed in the past in that the separation tank 9 is used for the separation of any gases sucked in through the main suction line and the driving fluid of the fluid suction unit is circulated when in use. It is needless to say that even the height of the separation tank according to the present invention is subjected to no restriction.

Therefore, in accordance with the present invention, it is possible to utilize the unloading pump for the entire unloading operation, especially for the stripping operation, that is, when the final portion of the liquid is being removed from the tank, by means of the separation tank which separates the air from the liquid, which air otherwise would have a deleterious effect on the unloading pump. When the level of the liquid being unloaded from the storage pumps drops to a point where air or gas is sucked into the suction pipe a simple changeover arrangement is provided for drawing the liquid first into the separation tank where any air or gas is removed from it and then supplying it to the unloading pump from the separation tank. By means of the liquid level controller in the separation tank the liquid removed from the outlet line from the pump and supplied to the fluid suction unit can be regulated to assure that the height of liquid within the tank is maintained at a predetermined level. By maintaining a specific height of liquid in the separation tank, during the latter part of the unloading operation, it is possible to provide a continuous flow of the liquid through the unloading pump so that no downtime is required in changing over to another storage tank in the unloading operation, and there is no problem of air or gas entering the unloading pump which would interfere with its operation.

Additionally, by means of the suction unit it is possible to unload the storage tanks completely without requiring any additional pumping equipment as has been used in the past.

In accordance with the present invention, the unloading pump, the separation tank, the fluid suction unit, the liquid level controller and the piping system forms a unitary assembly for completely unloading liquid storage tanks which operates independently of the configuration of the tanks so that the unloading operation with this equipment can be carried out from a variety of storage tank constructions and configurations.

By means of the fluid suction unit, the pressure of the air or gas in the space above the liquid level and the separation tank can be given a positive characteristic, so that no vacuum pump is required for venting the air or gas. As the gaseous component is separated from the liquid entering the separation tank under atmospheric conditions, the evaporation of the liquid is kept to a very small amount. Further, in the present apparatus, the ability to vent air or gas is greatly increased over that previously attainable.

By connecting the air vent pipe from the separation tank to one of the storage tanks, any problems, which might develop when the level of the liquid in the separation tank fluctuates to the extent that the liquid enters the vent pipe, are obviated and the control of the various parts of the apparatus is extremely simplified, minimizing the likelihood of any problems developing during operation.

When the last of the liquid within the storage tank is being stripped, the detection of the liquid level within the separation tank supplies signals for regulating one or both of the control valves on the outlet side of the unloading pump and the valve in the feed line supplying driving fluid to the suction unit so that a supply of liquid is maintained in the separation tank for circulation through the unloading pump. Even if the supply of liquid from the storage tank drops off to nothing because of the suction of air or gas through the bellmouthed opening or due to the closing of the valves in the suction line for changeover to another storage tank, it is possible to continue the circulation of the liquid through the unloading pump, fluid suction unit and separation tank back into the unloading pump so that the pump does not take in any air or gas which might cause any problems in its operation. As a result, the unloading pump can be operated safely even when the liquid level within the tank falls below the level of the bellmouthed opening in the suction line.

In accordance with the present invention, it is possible to utilize one of the storage tanks as a separation tank and, as has been apparent, a tank of relatively large volume may be used so that the liquid level within the tank varies very slowly with the resulting effect that the control of the liquid level is simplified.

Based on the arrangement of the apparatus disclosed above, it is not necessary that the liquid being unloaded pass through the suction unit, such as an eductor, but it can be drawn off through the bypass line which connects the suction line directly to the unloading pump so that the efficiency of the operation is enhanced.

When the liquid level within the storage tanks is maintained above a predetermined depth the unloading operation can be carried out without the use of the fluid suction unit and the separation tank by the operation of the various valves and the function of the unloading pump will not deteriorate.

The apparatus, in accordance with the present invention provides a simplified construction, a low manufacturing cost, easy maintenance, simple handling and safe operation. While a preferred embodiment of the invention has been disclosed in combination with the storage tanker, it will be understood that the invention is not limited to use with an oil tanker but it may be applied to unloading various types of liquid whether the storage tanks are in a floating or movable member or in a stationary position as is the case in a number of industrial storage tank applications.

What is claimed is:

1. Liquid-unloading apparatus comprising at least one liquid storage tank, an unloading pump for removing liquid from said storage tank, an outlet line for discharging liquid from said unloading pump, conduit means for conveying the liquid to be unloaded from said storage tank to said pump, a separation tank being located in said conduit means between said storage tank and said unloading pump, a bypass line being connected at one end to said conduit means and at its other end to said unloading pump for bypassing said separation tank in unloading liquid from said storage tank, valve means being arranged in said conduit means and sad bypass line for selectively controlling flow therethrough, a suction unit being positioned in said conduit means downstream of said connection of said bypass line to said conduit means, a feed line being connected at one end to said outlet line from said unloading pump and at its other end to said suction unit for supplying operating liquid to said suction unit, a valve being located in said feed line for controlling flow therethrough to said suction unit, means for detecting the level of the liquid in said separation tank, and a valve in said outlet line from said unloading pump downstream from the connection of said feed line to said outlet line for regulating flow from said pump to said suction unit for maintaining the level of the liquid in said separation tank at a predetermined height by means of a signal conveyed through said valve in said outlet line from said means for detecting the level of the liquid in said separation tank and means for venting gas from said separation tank.

2. Liquid-unloading apparatus, as set forth in claim 1, wherein a plurality of said liquid storage tanks being disposed in side-by-side relationship, and said separation tank being positioned adjacent to said storage tanks.

3. Liquid-unloading apparatus, as set forth in claim 1, wherein said unloading pump being located exteriorly of said storage tanks and being positioned adjacent and spaced above the level of the bottom of said tanks.

4. Liquid-unloading apparatus, as set forth in claim 1, wherein said conduit means comprising a first outlet line communicating between said storage tank and said separation tank, and a second outlet line communicating between said separation tank and said unloading pump.

5. Liquid-unloading apparatus, as set forth in claim 4, wherein said suction unit being positioned in said first outlet line, said bypass line being connected to said first outlet line upstream from said suction unit, and said valve means in said conduit means comprising a valve positioned in said first outlet line between said suction unit and the connection of said bypass line to said first outlet line and a valve being disposed in said second outlet line.

6. Liquid-unloading apparatus, as set forth in claim 1, wherein said means for discharging gas from said separation tank comprising a vent pipe connected at one end to said separation tank and extending therefrom for exhausting gas from said separation tank.